Feb. 28, 1939.  P. H. PRETZ  2,148,640
SPRING CONSTRUCTION
Filed Sept. 28, 1936
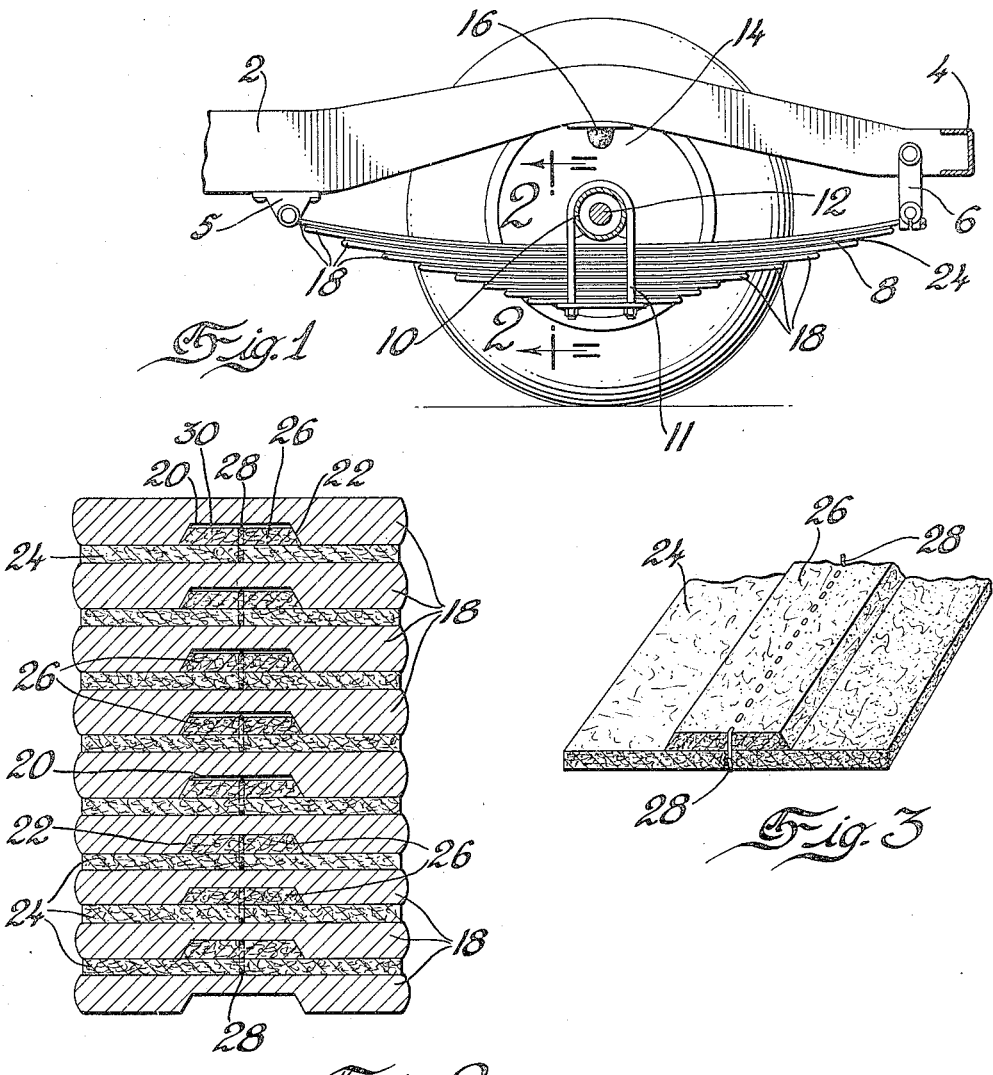
Inventor
Philip H. Pretz
By Blackmore, Spencer & Flint
Attorneys Patented Feb. 28, 1939

2,148,640

UNITED STATES PATENT OFFICE 2,148,640

SPRING CONSTRUCTION

Philip H. Pretz, Detroit, Mich., assignor to General Motors Corporation, Detroit, Mich., a corporation of Delaware Application September 28, 1936, Serial No. 102,857

1 Claim. (Cl. 267—47)

This invention relates to improvements in the manner of lubricating the multiple blade type of leaf spring used on automotive vehicles.

It is known that the ordinary type of leaf spring after it has been in use for a short time will produce a rubbing action between the leaves of the spring and cause a squeaking noise. This is true even where the blades have lubricant therebetween because the lubricant is dissipated in time, leaving the spring dry. This noise is very objectionable, and to eliminate it various kinds of lubricant or grease have been used and forced between the blades of the leaf spring. The spring has then been covered with a spring cover to retain the lubricant. It has been found, however, that the lubricant works out and the spring leaves eventually become dry and recommence the squeaking noise.

It is the object of the present invention to make a leaf spring wherein there is incorporated a structure which will furnish constant lubrication and which will prevent the squeaking of the spring leading to the interfrictional action of the blades. The object of the invention is accomplished by forming on the underside of each blade of the spring a groove which runs substantially the full length of the spring, is approximately one-third the blade width, and which has a depth equal to substantially one-half the blade thickness. Between each pair of adjacent leaves a paper or a fabric insert is provided and to this paper or fabric insert there is sewed a second narrower insert of paper or fabric which extends into the groove. Both of these inserts are wax impregnated or are saturated with lubricant before they are placed between the leaves. The inserts will last for the life of the spring, and inasmuch as there is very little weight on the smaller one, this smaller insert is readily capable of being relubricated in case the lubricant in the inserts dries out. Owing to the interposition of the lubricant saturated fabric there will be no metal to metal contact between the blades of the spring and there will therefore be less tendency for noise should the inserts lose their lubricating properties.

On the drawing:

Figure 1 is a view with parts shown in section of the rear part of an automobile showing the application of the usual multiple blade leaf spring.

Figure 2 is an enlarged section through the spring on the line 2—2 of Figure 1.

Figure 3 is an enlarged perspective view of the two inserts showing the manner in which they are attached.

On the drawing the numeral 2 indicates the frame of the vehicle. The frame has the rear cross bar 4, the front spring-bracket 5, and the rear sprink shackle 6. To the bracket 5 and shackle 6 there is connected the leaf spring 8 secured to the rear axle housing 10 by the U-bolts 11. The housing 10 houses the drive axle 12. The wheels 14 are suitably mounted on the axle housing 10 and are driven from the drive axle 12 in the usual way. A rubber buffer is indicated at 16 which strikes on the axle housing 10 for extreme flexures of the spring 8.

The spring 8 is composed of the individual blades 18 each of which is provided on its underside with a groove 20. The groove 20 runs the full length of the spring along the longitudinal center line thereof and has a depth equal to substantially one-half the thickness of the blade. In width the groove is approximately one-third the width of the spring. The groove 20 is preferably tapered at its sides as indicated at 22.

Between each pair of leaves 18 a paper or a fabric insert 24 is provided. This insert 24 extends the full length of the blades and has a width equal to the width of the blade. At its middle each insert 24 is provided with a second longitudinal insert 26 which is of paper or fabric and which is secured to the insert 24 by sewing as indicated at 28. This second insert 26 extends upwardly into the groove 20, but not for the full depth of all the grooves as shown at 30 in Figure 2.

By referring to Figure 2 it will be apparent that the pressure between the leaves of the spring is taken by the lateral parts of the blades between the groove 20 and the spring edge so that the insert 24 will be tightly compressed at its sides only. The intermediate portion immediately below the insert 26 and the insert 26 itself will not be greatly compressed so that the lubricant therein will be retained for a greater length of time. When the vehicle is traveling and the springs are being subjected to an upward and downward movement, the rubbing action between the blades 18 of the spring will cause them to rub over the inserts 24 to bring about a lubrication of the spring. Should any lubricant be lost through evaporation or otherwise from the outer edges of the inserts 24 there will be the tendency on the part of the insert 24, between the side faces of the blades, to draw lubricant from the central strip 26 to assure an adequate supply of lubricant between all the leaves. If it is desired to relubricate the insert 26, lubricant may be forced in the end at the channel 30, or the weight may be taken off the spring and lubricant applied to both inserts.

Referring to Figure 2, the lower three inserts 24 have the secondary insert 26 extending the full depth of the groove. The reason for this is that the grooves on the lower blades are of less depth than the grooves on the upper blades because of a decreased thickness or height in the lower blades 18.

By attaching the narrower insert 26 to the broader one 24, the narrower one will guide both and keep them in position. The splaying of the inserts is thus prevented.

If desired, the groove 20 may be omitted from the lowermost blade.

I claim:

In a leaf spring, said spring comprising a plurality of blades of different thicknesses, a groove in one face of each blade, a strip of antifriction material between adjacent blades, and a second narrower antifriction strip secured to the first strip and extending into the grooves, said second strip extending into the full depth of the groove of the thinner blades and only part way into the groove of the thicker blades.

PHILIP H. PRETZ.